United States Patent [19]

Nitta et al.

[11] 4,405,838

[45] Sep. 20, 1983

[54] PHONEME INFORMATION EXTRACTING APPARATUS

[75] Inventors: Tsuneo Nitta, Yokohama; Hideki Kasuya, Utsunomiya, both of Japan

[73] Assignee: Tokyo Shibaura Denki Kabushiki Kaisha, Kawasaki, Japan

[21] Appl. No.: 273,400

[22] Filed: Jun. 15, 1981

[30] Foreign Application Priority Data

Jun. 21, 1980 [JP] Japan .................. 55-84207

[51] Int. Cl.³ .......................................... G10L 1/00
[52] U.S. Cl. ................................. 179/1 SD
[58] Field of Search ............... 179/1 SD, 1 SB; 340/146.3 WD; 364/573

[56] References Cited

U.S. PATENT DOCUMENTS

| | | | |
|---|---|---|---|
| 4,038,503 | 7/1977 | Moshier | 179/1 SD |
| 4,059,725 | 11/1977 | Sakoe | 179/1 SD |
| 4,060,694 | 11/1977 | Suzuki et al. | 179/1 SD |
| 4,087,632 | 5/1978 | Hafer | 179/1 SD |

FOREIGN PATENT DOCUMENTS

2373117 France.

OTHER PUBLICATIONS

L'onde Electrique, Val. 57, No. 5, May 1977, Paris. C. Berger-Vachon et al., pgs. 387-391.

*Primary Examiner*—Emanuel S. Kemeny
*Attorney, Agent, or Firm*—Oblon, Fisher, Spivak, McClelland & Maier

[57] ABSTRACT

A phoneme information extracting apparatus includes correlation data generators for successively generating correlation data representing the correlation between the acoustic power spectrum data corresponding to input voice and power spectrum data of various reference phonemes, selection circuits for successively transferring these correlation data when they detect that three or more successive correlation data have values greater than a predetermined value, maximum data hold circuits for holding the maximum correlation data among the correlation data transferred from the respective selection circuits, and a phoneme determination circuit for determining the optimum phoneme by detecting one of the data hold circuits that is holding the maximum correlation data among the correlation data held in the data hold circuits.

13 Claims, 12 Drawing Figures

PHONEME INFORMATION EXTRACTING APPARATUS

BACKGROUND OF THE INVENTION

1. Field of the Invention

This invention relates to phoneme information extracting apparatus for extracting phoneme information used for recognizing a continuous voice tract in terms of phonemes.

2. Description of the Prior Art

Recently, it has been proposed to use as the input device of a data processor a voice recognizing apparatus which recognizes input voice and generates voice data corresponding to the recognized input voice. In such a voice recognizing apparatus, the voice is recognized by comparing a voice pattern that is obtained, for instance, by compressing an input voice signal and a preliminarity registered voice pattern or by comparing information of phoneme strings obtained through conversion of the input voice signal and information of phoneme strings preliminarily registered for each word or phrase. In the case of the former voice recognition apparatus, the accuracy of the voice recognition is high, so that it is advantageous for processing a few words. However, if a large number of words are to be recognized, it is difficult to make real-time recognition of the voice. In addition, a memory having a large capacity is required for storing a great quantity of word information. In the latter voice recognition apparatus, the precision of the voice recognition greatly depends upon the recognition score of individual phonemes obtained from the input voice. Presently, there are two different phoneme recognition apparatus; namely one in which the input voice signal is divided into successive phoneme-unit sections and phonemes in the individual sections are recognized, and the other in which the input voice signal is divided into frames each covering a constant time period and the phonemes in the individual frames are recognized. The former phoneme recognition apparatus has a merit that the individual phonemes can be recognized with high precision. However, difficulties are encountered in dividing the input voice signal into phoneme-units, so that the utility of this apparatus is limited. In the latter phoneme recognition apparatus, the input voice signal is divided into frames covering a fixed time period, for instance 10 to 20 msec., and the phoneme data for each frame is recognized through comparison with preliminarily registered phoneme. In this case, however, the precision of recognition is inferior because the phoneme data are recognized in a sort of forecasting way from the partial data obtained in a divided or limited period of time. Accordingly, in practice a plurality of phonemes obtained as a result of phoneme recognition in individual frames are given respective priorities or probabilities, and voice is recognized for each unit word through comparison of these phoneme data and reference phoneme data that are registered as unit words (for instance [tokjo] for the word "TOKYO"). At this time, warping of the voice in the time axis direction due to variation in length of the voice producing time can be absorbed by using a dynamic programming method when comparing the input phoneme strings and the registered unit word phoneme data. However, in this phoneme recognition method it is necessary to execute the phoneme recognition in such a short period of time as one frame. Particularly, when a voice series is continuously produced, the individual uttered phonemes are influenced by the immediately preceding and succeeding phonemes in dependence upon the restrictions imposed upon the operation of the voice producing organ (which is referred to as coarticulation), and the input voice signal sometimes contains phoneme data which represent different phonemic features from those of the reference phoneme data that are preliminarily registered for the phoneme recognition. For example, when uttering the words "the eye" ( |əi ai|) comparatively slowly, the phonemic features, for instance power spectra or formant that appear on the power spectra, have substantially the same values as the phonemic features of separately pronounced phonemes [əi] and [ai]. However, when the voice for the words "the eye" is uttered quickly, the phoneme [a] is strongly influenced by the adjacent phonemes [əi] and [i], so that the phonemic feature of this frame is no longer of the phoneme [a] but is altered to be close to the phonemic features of the preceding and succeeding phonemes [i], and in this case, the proper recognition of the phoneme can no longer be obtained. In order to solve this problem, it has been known to preliminarily register as reference phoneme data, for instance, an imaginary phoneme ["ia"] that appears at the time of transition from the phoneme [i] to the phoneme [a]. More particularly, when the words "the eye" are pronounced, either a phoneme string [ə]→[i]→[a]→[i] or a phoneme string [ə]→[i]→["ia"]→[i] is obtained, and accordingly phoneme string data ([ə]→[i]→["ia"]→[i]) are preliminarily stored in a dictionary memory so that the utterance of the words "the eye" can be recognized as such through the comparison with these data. In this phoneme recognition method, however, for a large number of phoneme combinations an enormous amount of reference phoneme data (inclusive of the imaginary phoneme data) have to be registered, and also it is difficult to obtain the phoneme extraction when the voice is uttered quickly.

SUMMARY OF THE INVENTION

An object of the invention is to provide a phoneme information extracting apparatus, with which the phoneme information of continuously generates voice can be extracted with high accuracy.

In one preferred form of the invention, there is provided a phoneme information extracting apparatus having a memory in which a plurality of reference phoneme parameter patterns corresponding to respective reference phonemes are stored, an acoustic parameter generator for sequentially generating acoustic parameters corresponding to input voice, a similarity data generator for sequentially generating similarity data related to the similarity between the acoustic parameter generated from the acoustic parameter generator and the acoustic parameter for each reference phoneme read out from the memory, a checking device for checking whether the received data represents a greater degree of similarity than a predetermined similarity, a data selector for generating, when it is detected that a predetermined number of successive similarity data regarding the same reference acoustic parameter represent similarity degrees greater than the predetermined similarity degree, the successive similarly data for the same reference acoustic parameter which are dealt, and a phoneme determination means device for successively receiving effective similarity data from the data selector, holding data representing the maximum similarity among the effective similarity data and generating phoneme data representing a reference phoneme corresponding to the data having the maximum similarity.

According to this invention, detected similarity representing data is checked to be effective or not based on information relating to the similarity between the phoneme of an input voice and each of a plurality of reference phonemes. Only when the detected effective data is interrupted, most pertinent data is extracted from the detected effective data with respect to individual reference phonemes, attaining comparatively precise phoneme data corresponding to phonemes of an input voice.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

Prior to describing an embodiment of the phoneme information extracting apparatus according to the invention, the principles underlying the invention will first be explained. According to the invention, instead of determining the individual phoneme for each frame, the distance or similarity between the input voice and each registered reference phoneme is instantaneously detected, and each phoneme is identified on the basis of a distance pattern or likelihood pattern representing the change of the distance or similarity with time. Here, as the distance measure for the distance between the input voice and each reference phoneme may be used the Euclid distance or mutual correlation of the logarithmic spectrum, the Euclid distance or mutual correlation of the cepstrum, the Euclid distance or mutual correlation of the vocal tract area function or the likelihood ratio. When a number of speakers are dealt with, the Mahalanobis distance or the like is used as the distance measure. These distance measures represent the feature of each phoneme, i.e., the state of the vocal organ, and thus the distance pattern represents the movement of the vocal organ.

Now, the case of extracting the phonemes of a voice "kaki kueba (when I eat a persimmon)" will be described.

First, the formant frequency data $F_j = (F_{1j}, F_{2j}, F_{3j})$ is extracted as the acoustic parameter of the input voice, and the distance d between the formant frequency of the input voice and the formant frequency of the registered reference phoneme or vowel $V (= |i, e, a, o, u|)$ is calculated using an equation $$d(V,j) = (\mu^{(v)} - F_j)^t \cdot \{\epsilon^{(v)} \nabla^{-1} \cdot (\mu^{(v)} - F_j)$$

where j represents the calculation timing of the Mahalanobis distance d, $\mu^{(v)}$ represents the average vector in the formant space of the vowel $|V|$, $\epsilon^{(v)}$ represents the covariance matrix of the average spectrum and $(\mu^{(v)} - F_j)^t$ represents the transposed vector of the $(\mu^{(v)} - F_j)$.

Figure 1:
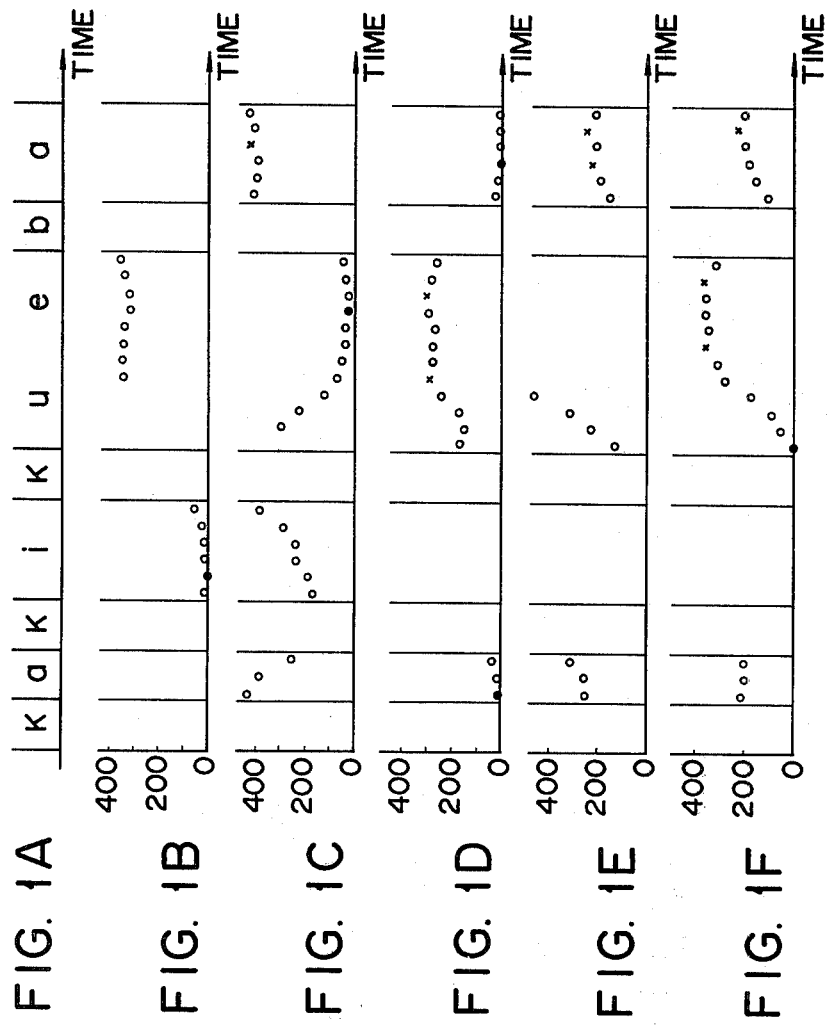
FIGS. 1A to 1F are views illustrating the operational principles underlying the invention, FIG. 1A showing phonemic changes of input voice and FIGS. 1B to 1F showing distance data representing the Mahalanobis distances between reference phonemes |i|, |e|, |a|, |o| and |u| and the phoneme of an input voice shown in FIG. 1A.

On the basis of this equation, the Mahalanobis distance of the reference vowels [i], [e], [a], [o] and [u] for the individual vowels of the input voice as shown in FIG. 1A is calculated to obtain distance patterns as shown in FIGS. 1B to 1F. In FIGS. 1B to 1F, the ordinate is taken for the Mahalanobis distance d, and the abscissa is taken for time.

On the basis of these distance patterns, the continuity of the effective distance data is checked. In this example, these distance data are determined to be effective when three or more successive data all have values less than a distance "400". Thus, as shown in FIG. 1C, for example, in the distance pattern representing the Mahalanobis distance between input vowel "a" and the reference vowel "e", all of the three successive distance data do not have values less than the distance "400", and thus it is judged that these distance data are ineffective.

Then, maximal of these effective distance data is detected, and the effective distance pattern is divided into a plural sections with respect to the effective distance data having the maximal value. For example, as shown in FIG. 1D, the distance pattern representing the Mahalanobis distance between the input phonemes "u, e" and reference phoneme "e", is divided into three portions with respect to the fifth and tenth distance data. In FIGS. 1C to 1F, the maximal distance data are indicated by cross marks.

Then, the coverage relation in the original distance patterns and divided distance patterns is checked. For example, at the end of each effective distance pattern, its length in the direction of the time axis is compared with those of other distance patterns, and if the distance pattern has shorter length than any one of the other distance patterns, it is deleted; the first division of the distance pattern of the reference phoneme "a" (FIG. 1D) and the distance pattern of the reference vowel "o" (FIG. 1E) with respect to the input vowel "u" are both determined to be covered in the first division of the distance pattern representing the distance of the input phoneme "u" and reference phoneme "u" as shown in FIG. 1F and are thus deleted.

The optimum input phoneme is determined by detecting the distance data having the minimum value among the effective distance data that are selected in a manner described above. For example, with respect to the first input vowel "a", the distance patterns representing the Mahalanobis distances of the input phoneme with respect to the reference phonemes "a", "o" and "u" respectively shown in FIGS. 1D, 1E and 1F are determined to be effective and not deleted, and among these data the data of the first distance pattern in FIG. 1D has the minimum value, so that the phoneme data corresponding to the reference phoneme "a" represented by the minimum distance data is extracted as the optimum phoneme. The minimum distance data finally obtained from among those shown in FIGS. 1B to 1F are indicated by black circular marks.

Now, preferred embodiments of the phoneme information extracting apparatus according to the invention will be described with reference to the accompanying drawings.

Figure 2:
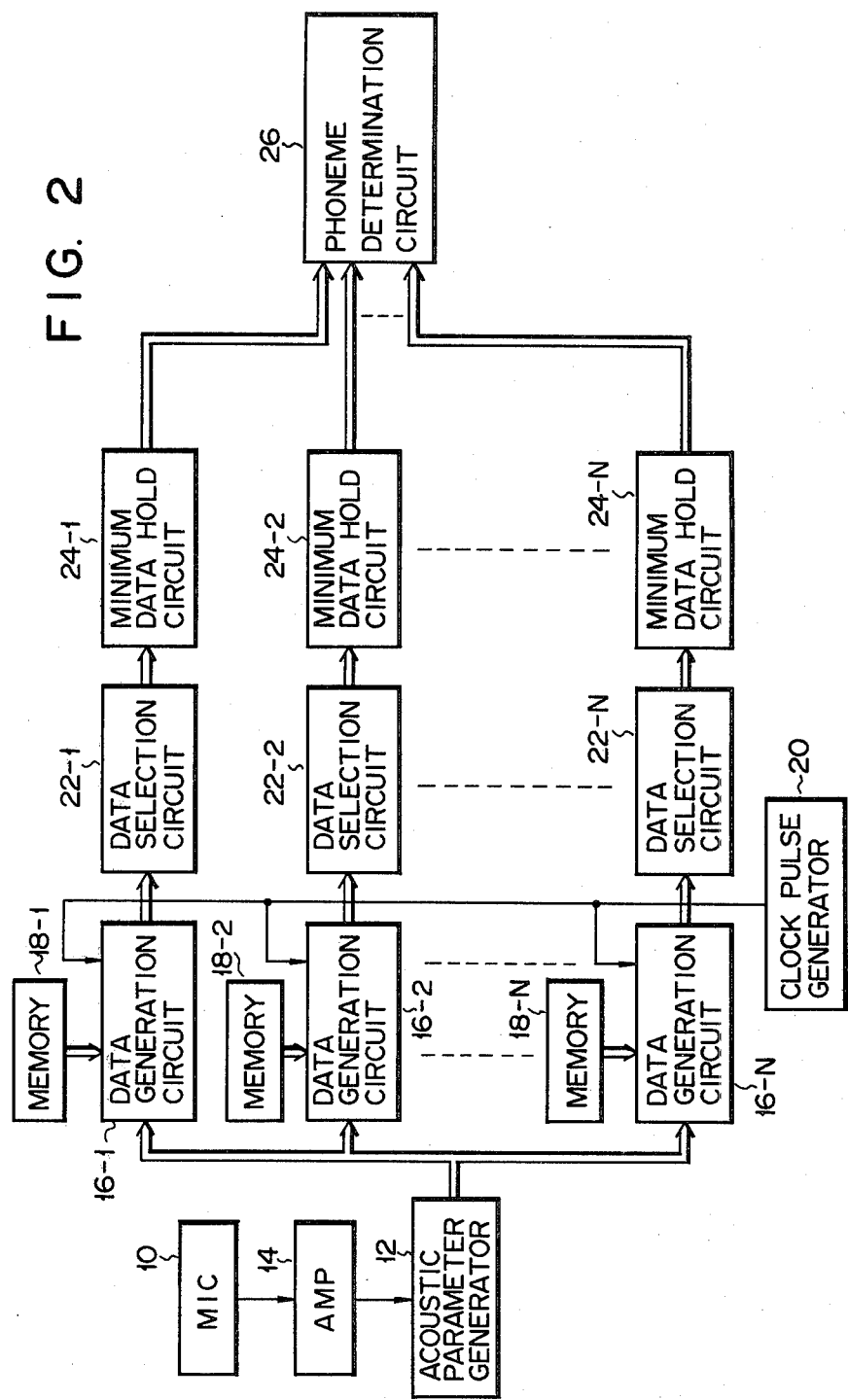
FIG. 2 is a block diagram showing an embodiment of the phoneme information extracting apparatus according to the invention.

FIG. 2 schematically represents an embodiment of the phoneme information extracting apparatus which includes an acoustic parameter extraction circuit including a microphone 10, i.e., an electroacoustic converter for converting the input voice to an electrical voice signal and an acoustic parameter generator 12 for receiving the voice signal from the microphone 10 through an amplifier 14 and generating an acoustic parameter, for instance formant information, in accordance with the received voice signal. The formant information of the acoustic parameter generator 12 is supplied to a plurality of distance data generation circuits 16-1 to 16-N. These distance data generation circuits 16-1 to 16-N also receive the information of respectively peculiar reference phonemes from memories 18-1 to 18-N and generate distance data representing the distance between the phoneme represented by the formant information from the acoustic parameter generator 12 and the reference phoneme represented by the formant information stored in the respective memories 18-1 to 18-N in response to a clock pulse signal, for instance at 50 to 100 Hz, generated from a clock pulse generator 20. The distance data from the distance data generation circuits 16-1 to 16-N are supplied to respective effective distance data selection circuits 22-1 to 22-N, which select distance data satisfying predetermined conditions from among the received distance data and supplies the selected distance data to minimum data hold circuits 24-1 to 24-N. Each of the data hold circuits 24-1 to 24-N detects the minimum data among the distance data successively transfered from the corresponding one of the data selection circuits 22-1 to 22-N and holds the detected minimum data. The minimum data thus held in the data hold circuits 24-1 to 24-N are supplied to a phoneme determination circuit 26, which detects one of the data hold circuits 24-1 to 24-N in which the distance data having the minimum value is held.

Figure 3:
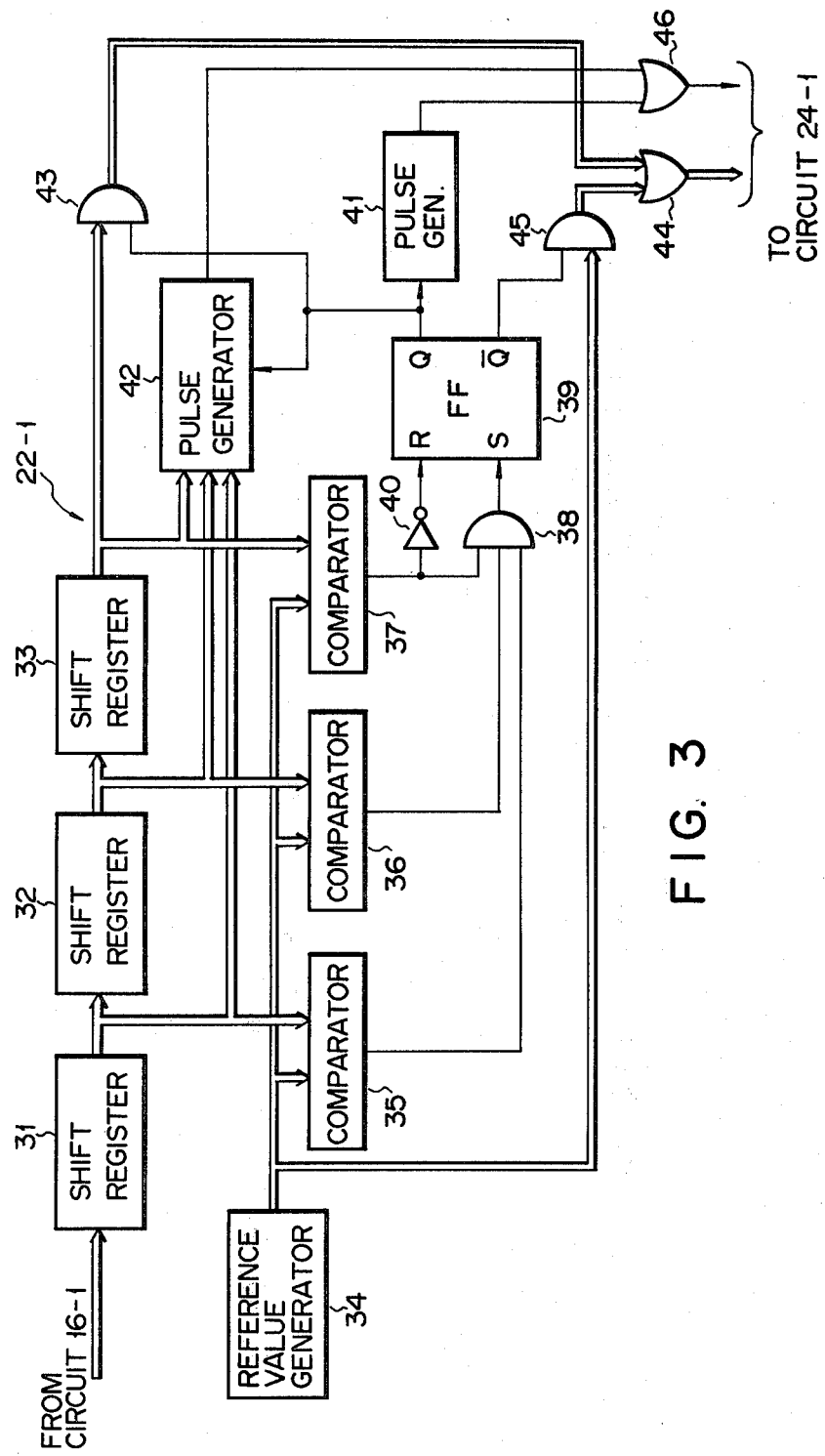
FIG. 3 is a schematic diagram showing the detailed circuit construction of a data selection circuit used in the phoneme information extracting apparatus shown in FIG. 2.

FIG. 3 shows a detailed circuit diagram of the effective distance data selection circuit 22-1. The construction and operation of the other effective distance data selection circuits 22-2 to 22-N are the same as those of this effective distance data selection circuit 22-1 and are thus not described.

The effective distance data selection circuit 22-1 includes three cascade-connected shift registers 31 to 33. These shift registers 31 to 33 are driven by, for instance, a clock pulse signal of the clock pulse generator 20 shown in FIG. 2, whereby the distance data from the distance data generation circuit 16-1 is progressively shifted through the shift registers 31 to 33. The output data from the shift registers 31 to 33 are compared with a reference value from a reference value generator 34 in respective comparators 35 to 37. The comparators 35 to 37 generate an output signal "1" if the output data from the respective shift registers 31 to 33 is less than the reference value. The output terminals of the comparators 35 to 37 are connected to respective input terminals of an AND gate 38 which has its output terminal connected to the set input terminal S of an R-S flip-flop circuit 39. The output terminal of the comparator 37 is also connected to the reset terminal R of the flip-flop circuit 39. The Q output terminal of the flip-flop circuit 39 is connected to pulse generators 41 and 42 and also to a first input terminal of the AND gate 43. The pulse generator 42 generates a pulse when the output data of the shift register 32 assumes a value greater than those of the output data of the shift registers 31 and 33 in the presence of a high level Q output signal from the flip-flop circuit 39. The pulse generator 42 may be constructed by, for instance, first and second comparators (not shown) which generate a pulse when the output data of the shift register 32 becomes higher than the output data of the respective shift registers 31 and 33 and an AND gate (not shown) which receives the output signals from the first and second comparators and the output signal from the Q output terminal of the flip-flop circuit 39.

The output data from the shift register 33 is supplied through the AND gate 43 and an OR gate 44 to the phoneme determination circuit 26, while the output data from the reference value generator 34 through an AND gate 45, which is controlled by the Q output signal from the flip-flop circuit 39, and the OR gate 44 to the phoneme determination circuit 26. The output pulses of the pulse generators 41 and 42 are also supplied through an OR gate 46 to the phoneme determination circuit 26.

In the effective distance data selection circuit 22-1 shown in FIG. 3, the distance data from the distance data generation circuit 16-1 is successively supplied through the shift registers 31 to 33. If the content of the shift register 33 has a value greater than the output data of the reference value generator 34, for instance, representing the distance "400", the comparator 37 provides an output signal "0" to reset the flip-flop circuit 39. So long as the flip-flop circuit 39 is in the reset state, the AND gate 43 is held disabled, while the AND gate 45 is held enabled. In this state, the output data "400" from the reference value generator 34 is thus supplied through the AND gate 45 and OR gate 44 to the phoneme determination circuit 26.

When the contents of the shift registers 31 to 33 assume values less than the distance "400", the flip-flop circuit 39 is set. In this case, each of the comparators 35 to 37 produces an output signal "1", whereupon a set signal is supplied from the AND gate 38 to the flip-flop circuit 39. When the flip-flop circuit 39 is set in this way, the AND gate 43 is enabled while the AND gate 45 is disabled. Thus, in this state, the output data of the shift register 33 is supplied through the AND gate 43 and OR gate 44 to the minimum data hold circuit 24-1. When it is detected in the set state of the flip-flop circuit 39 that the content of the shift register 32 is greater than the contents of the shift registers 31 and 33, the pulse generator 42 supplies a trigger or start signal through the OR gate 46 to the data hold circuits 24-1 to 24-N and phoneme determination circuit 26. The flip-flop circuit 39 is held in the set state until the content of the shift register 33 comes to assume a value greater than the distance value "400", and consequently the comparator 37 produces an output signal "0". At this time, if the flip-flop circuit 39 is switched from its set state to the reset state, a trigger or start signal is supplied from the pulse generator 41 through the OR gate 46 to the data hold circuits 24-1 to 24-N and phoneme determination circuit 26 in response to the Q output signal from the flip-flop circuit 39.

Figure 4:
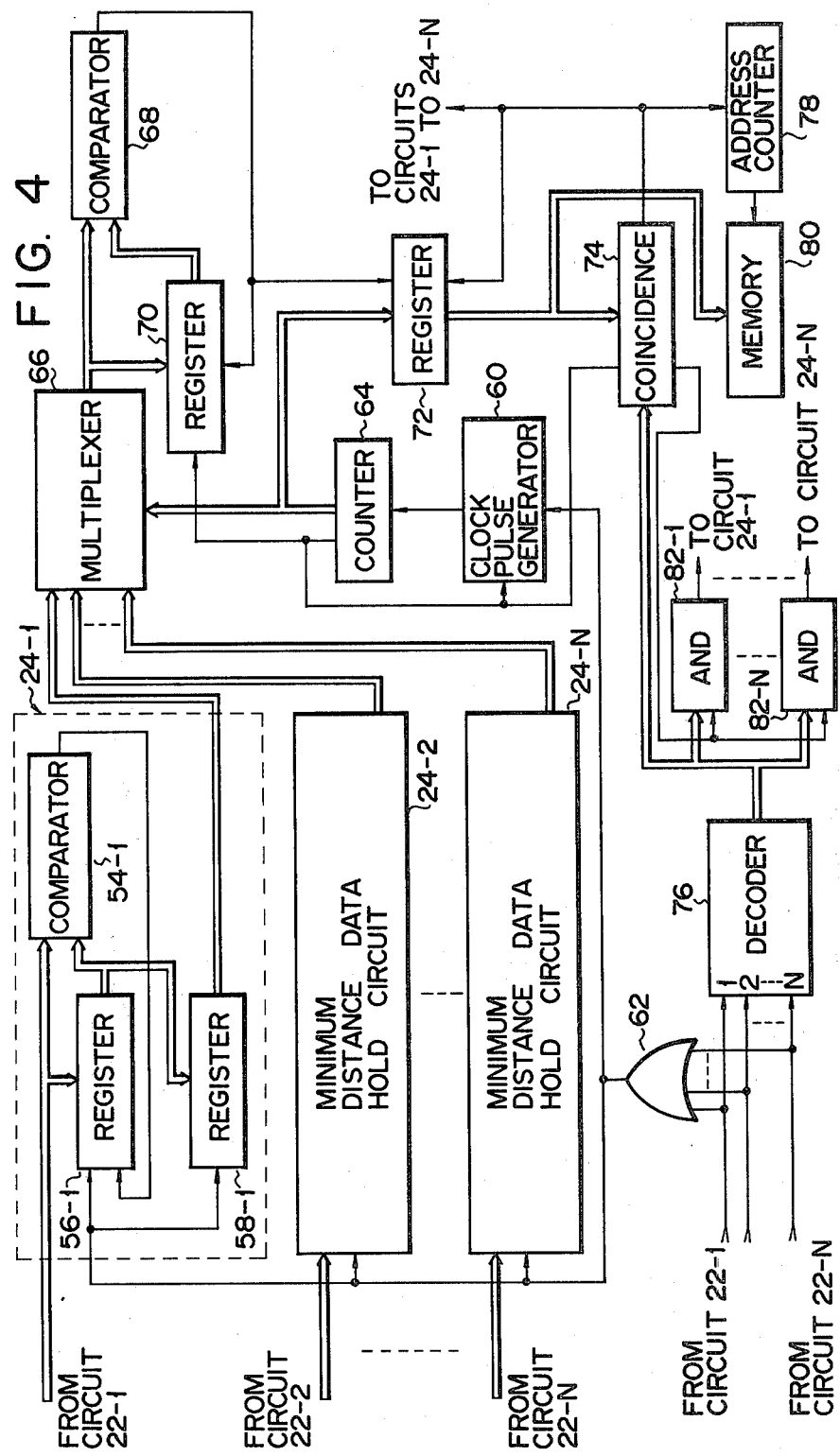
FIG. 4 is a block diagram showing the detailed circuit construction of minimum distance data hold circuits and a phoneme determination circuit used in the phoneme information extracting apparatus shown in FIG. 2.

FIG. 4 shows the detailed circuit construction of the minimum data hold circuits 24-1 to 24-N and phoneme determination circuit 26 shown in FIG. 2. The data hold circuits 24-1 to 24-N are constructed and operate in the same way, and here the construction and operation of the data hold circuit 24-1 will be described. The minimum distance data hold circuit 24-1 includes a comparator 54-1, which compares the distance data from the distance data selection circuit 22-1 and the content of a register 56-1. When it is detected that the former data is less than the latter, the comparator 54-1 causes the former data to be stored in the register 56-1. The data hold circuit 24-1 further includes a register 58-1 for storing the content of the register 56-1 in response to a start signal generated from one of the distance data selection circuits 22-1 to 22-N. The register 56-1 is set for storing the distance data "400" in response to the start signal.

The phoneme determination circuit 26 includes a clock pulse generator 60, which generates a clock pulse signal in response to a start signal supplied from at least one of the selection circuits 22-1 to 22-N through an OR gate 62, a counter 64 which counts clock pulses from the clock generator 60, a multiplexer 64 which permits output signals from the hold circuits 24-1 to 24-N to pass through one after another according to the count signal of the counter 64, and a comparator 68 which compares the distance data from the multiplexer 64 and the content of a register 70 and, when the former data is less than the latter, generates a set signal to cause the former data to be stored in the register 70. The set signal from the comparator 68 is also supplied to a register 72 to let the present count from the counter 64 be set in the register 72. The data stored in the register 72 is supplied to a coincidence circuit 74 together with the output signal from a decoder 76 which generates a code signal corresponding to at least one of the selection circuits 22-1 to 22-N that has generated the start signal. The coincidence circuit 74 supplies an output pulse when it detects that both the input signals coincide. As a result, an address counter 78 supplies an instruction pulse to, for instance, a first memory location of the memory 80 to cause the data stored in the register 72 to be transferred to the first memory location.

In the circuit shown in FIG. 4, the distance data from the effective pattern selection circuits 22-1 to 22-N are supplied to the respective minimum distance data hold circuits 22-1 to 22-N, and their minimum distance data are held in these hold circuits 24-1 to 24-N. Then, when a start signal is provided from at least one of the selection circuits 22-1 to 22-N, the minimum distance data are supplied from the hold circuits 24-1 to 24-N to the multiplexer 66. At this time, the start signal is also supplied to the clock pulse generator 60, thus causing the clock pulse generator 60 to generate clock pulses. In response to the clock signal of the clock pulse generator 60, the counter 64 supplies the count data to the multiplexer 66 to permit the output signals from the hold circuits 24-1 to 24-N to be progressively provided from the multiplexer 66. After the counter 64 counts N clock pulses, i.e., after the output signal from the last-stage hold circuit 24-N is supplied through the multiplexer 66 to the comparator 68, the initial state is brought about again to produce a reset signal to stop the operation of the clock pulse generator 60. The minimum distance data successively provided through the multiplexer 66 are sequentially compared in the comparator 68 with the content of the register 70. Every time the comparator 68 detects that the distance data from the multiplexer 66 is less than the distance data stored in the register 70, it supplies a set signal to the registers 70 and 72 to let the distance data from the multiplexer 66 be stored in the register 70 and also let the present count data in the counter 64 be stored in the register 72. In other words, when N clock pulses from the clock pulse generator 60 are counted by the counter 64, distance data having the minimum value among the output data from the data hold circuits 24-1 to 24-N and data designating the corresponding phoneme are stored in the registers 70 and 72 respectively. The register 70 stores the distance data "400" in response to the reset signal from the counter 64, and the content of the register 72 is supplied to the coincidence circuit 74. The coincidence circuit 74 is rendered operative in response to the reset signal from the counter 64, and when it detects that the output data from the register 72 and the output data from the decoder 76 coincide, i.e., when it detects that one of the hold circuits connected to that one of the selection circuits 22-1 to 22-N which has generated the start signal holds the minimum distance value, it supplies a pulse to the address counter 78 to let the phoneme designating data stored in the register 72 to be transferred to the memory location of the memory 80 specified by the address counter 78. The output pulse from the coincidence circuit 74 is supplied to the register 72 to clear the register 72. Also, though not shown for the sake of simplicity, it is supplied to the registers 58-1 in the hold circuits 24-1 to 24-N to set the distance data "400" in these registers 58-1.

When the coincidence circuit 74 detects that both the input signals do not coincide, an output pulse from the coincidence circuit 74 is transferred through one of AND gate circuits 82-1 to 82-N which is selectively enabled by an output signal from the decoder 76 to the selected one of the data hold circuits 24-1 to 24-N which is connected to that one of the selection circuits 22-1 to 22-N which has generated a start signal, setting the register 58-1 in that hold circuit to have a distance data "400".

Now, the operation of the phoneme information extracting apparatus shown in FIGS. 2 to 4 will be described.

The acoustic parameter generator 12 extracts the formant information from the voice signal received from the microphone 10 through the amplifier 42 and supplies the digital data corresponding to the formant information to the distance data generation circuits 16-1 to 16-N. The distance data generation circuits 16-1 to 16-N compare the formant data from the respective memories 18-1 to 18-N and the formant data from the acoustic parameter generator 12 in response to a clock pulse from the clock pulse generator 20 and supply their output data representing the distance between the respective peculiar reference phoneme and input phoneme to the effective distance data selection circuits 22-1 to 22-N.

As has been described earlier in connection with FIG. 3, each of the effective distance data selection circuits 22-1 to 22-N receives the distance data time-sequentially supplied from the corresponding one of the distance selection circuits 16-1 to 16-N and, when it is detected that three or more successive distance data are all less than the distance data "400", it sequentially supplies these three or more distance data to the corresponding one of the hold circuits 24-1 to 24-N as effective distance data. Each of the effective distance data selection circuits 22-1 to 22-N generates a start signal if three or more successive data having values less than the distance data "400" are terminated or if a distance data having a greater value than immediately preceding and succeeding distance data among the three or more effective distance data is generated.

As has been described earlier in connection with FIG. 4, each of the minimum distance data hold circuits 24-1 to 24-N sequentially receives the successive distance data from the corresponding one of the distance data selection circuits 22-1 to 22-N and holds the data having the minimum value among the received data. When a start signal is generated from at least one of the selection circuits 22-1 to 22-N, the distance data held in the individual data hold circuits 24-1 to 24-N are compared with one another, whereby that one of the data hold circuits 24-1 to 24-N which stores the distance data of the minimum value is detected. If it is detected that this minimum distance data is generated from one of the data hold circuits 24-1 to 24-N connected to that one of the selection circuits 22-1 to 22-N which has generated the start signal, digital data designating the formant information stored in one of the memories 18-1 to 18-N related to that one of the data hold circuits 24-1 to 24-N is written into the memory 80. If it is detected that the detected minimum distance data is not generated from one of the data hold circuits 24-1 to 24-N connected to that one of the selection circuits 22-1 to 22-N which has generated the start signal, the register 58-1 in that one of the data hold circuits 24-1 to 24-N which is connected to the data selection circuit which has generated the start signal is set through the corresponding one of the AND gate circuits 82-1 to 82-N to have distance data "400". Subsequently, every time a start signal is generated from the data selection circuits 22-1 to 22-N, the same data processing as described above has been executed, whereby the phoneme data which are determined to be effective are successively written into the memory 80.

Figure 5:
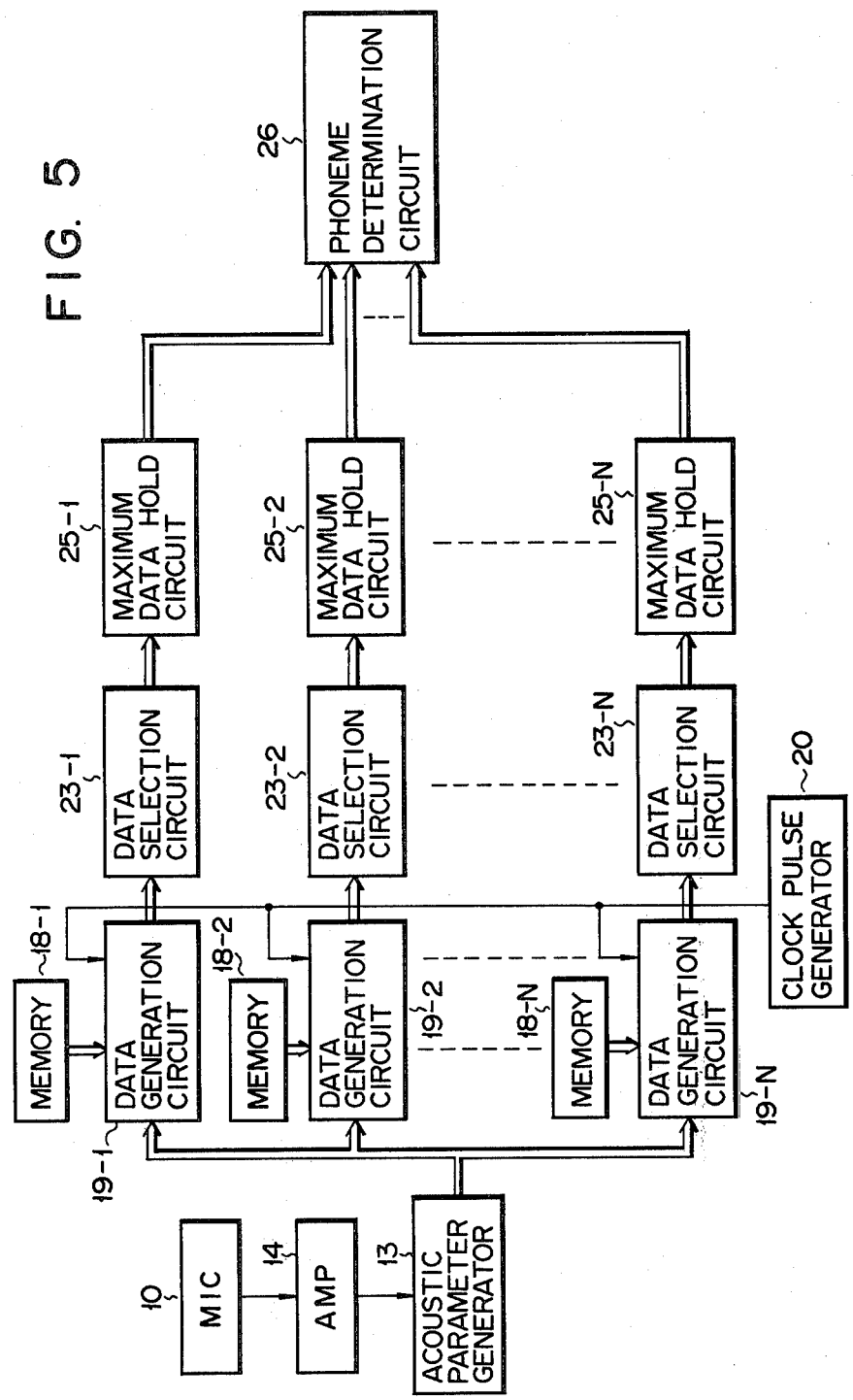
FIG. 5 is a block diagram showing a different embodiment of the phoneme information extracting apparatus according to the invention.
Figure 6:
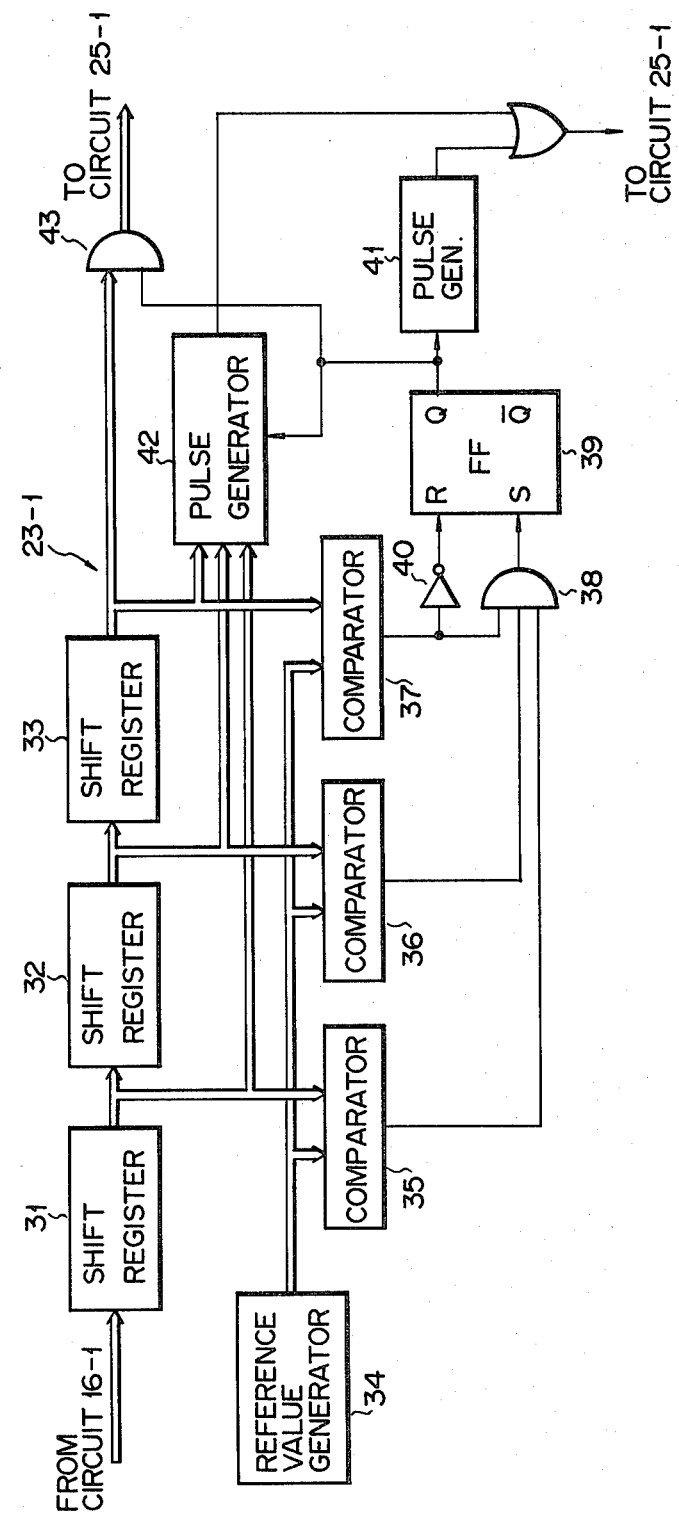
FIG. 6 is a schematic diagram showing the detailed circuit construction of a selection circuit used in the phoneme information extracting apparatus shown in FIG. 5.
Figure 7:
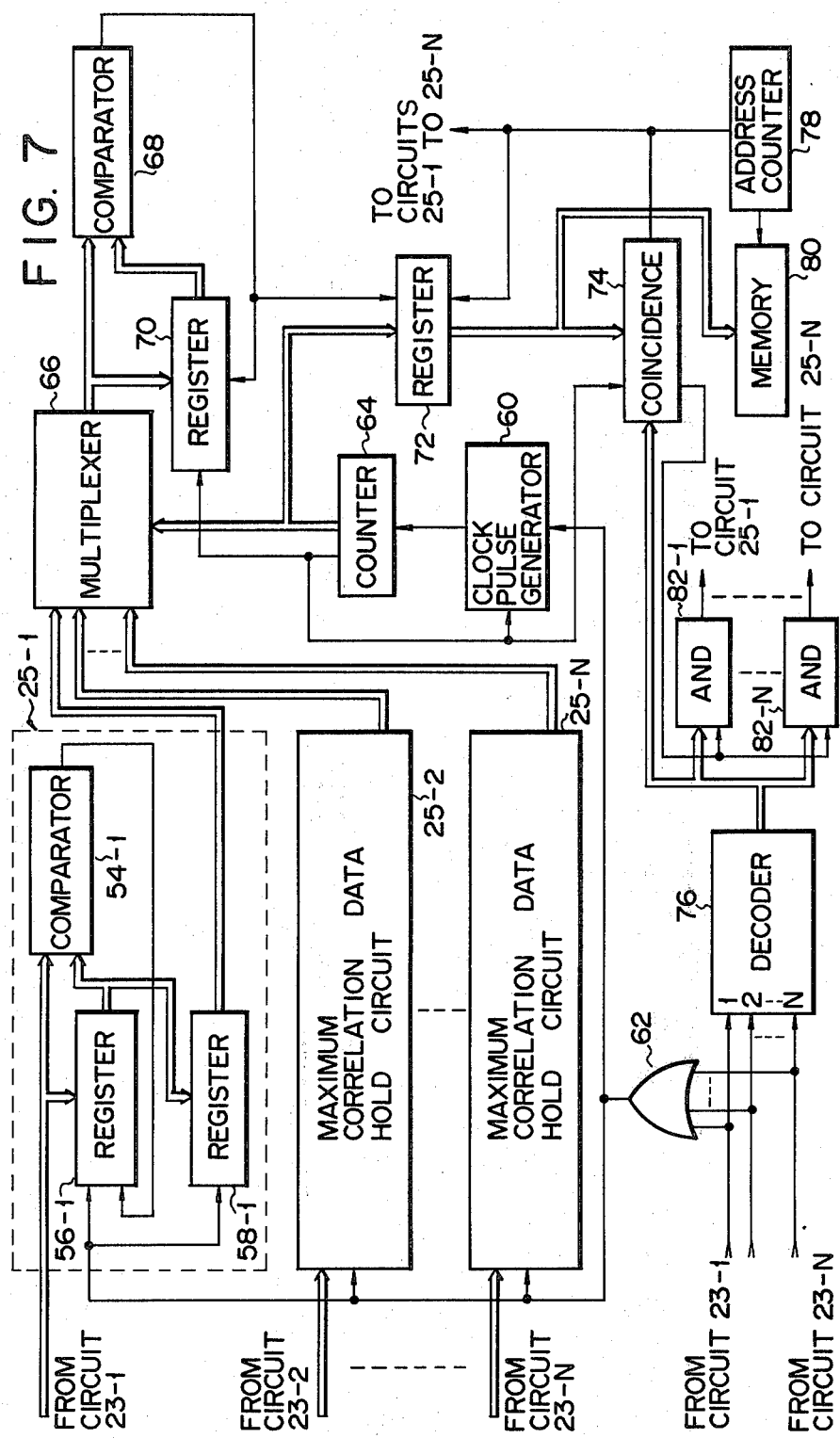
FIG. 7 is a block diagram showing the detailed circuit construction of maximum correlation data hold circuits and a phoneme determination circuit used in the phoneme information extracting apparatus shown in FIG. 5.

FIGS. 5 to 7 show a different embodiment of the phoneme information extracting apparatus according to the invention. This phoneme information extracting apparatus includes an acoustic parameter generator 13, which generates acoustic power spectrum data instead of the formant information as the acoustic parameter. Here, the acoustic power spectrum data from the parameter generator 13 and the acoustic power spectrum data of the reference phoneme are compared to calculate the correlation coefficient or similarity of the two acoustic power spectrum data, and the optimum phoneme is determined from the correlation data. In the memories 18-1 to 18-N of the phoneme information extracting apparatus of FIG. 5, the phoneme power spectrum data of respective reference phonemes are stored, and the data generation circuits 19-1 to 19-N generate correlation data representing the correlation between the acoustic power spectrum data of the input voice and the acoustic power spectrum data of the reference phonemes stored in the memories 18-1 to 18-N in response to clock pulses from the clock pulse generator 20. The correlation data from the data generation circuits 19-1 to 19-N are sequentially supplied to the data selection circuits 23-1 to 23-N. The data selection circuit 23-1 shown in FIG. 6 has substantially the same construction as the data selection circuit 22-1 shown in FIG. 3 except that it does not include the OR gate 44 and AND gate 45. However, in the data selection circuit 23-1 the comparators 35 to 37 generate a high level output signal when they detect that the contents of the shift registers 31 to 33 are greater than the reference value from the reference value generator 34, while the pulse generator 42 generates a pulse signal when it detects that the content of the shift register 32 is smaller than the contents of the shift registers 31 to 33 in the presence of the high level Q output signal from the flip-flop circuit 39. The flip-flop circuit 39 is reset in response to a low level output signal from the comparator 37 to provide a low level Q output signal. The pulse generator 41 provides an output pulse when the Q output signal from the flip-flop circuit 39 is changed from high level to low level.

The data from the data selection circuits 23-1 to 23-N are supplied to maximum correlation data hold circuits 25-1 to 25-N shown in FIG. 7. The data hold circuit 25-1 compares the correlation data from the selection circuit 23-1 and the content of the register 56-1, and when the former is greater than the latter, it supplies a set signal to the register 56-1 to let the former data be stored in the register 56-1. Like the case of the circuit shown in FIG. 4, the maximum similarity data from the data hold circuits 25-1 to 25-N are sequentially supplied through the multiplexer 66 to the comparator 68 every time a start signal is generated from at least one of the selection circuits 23-1 to 23-N. The comparator 68 compares the similarity data supplied through the multiplexer 66 and the content of the register 70, and when it detects that the former data is greater than the latter, the comparator 68 causes the correlation data supplied through the multiplexer 66 to be stored in the register 70. Also, the content of the counter 64 obtained when the content of the register 70 is changed is stored in the register 72. Thus, immediately after N clock pulses are generated from the clock pulse generator 60 and counted by the counter 64, count data designating that one of the data hold circuits 25-1 to 25-N which has held the maximum correlation data, i.e., count data designating one of the reference phonemes, is selected from the output data of the data hold circuits 25-1 to 25-N and is stored in the register 72. Except for those described above, the construction and operation of the phoneme determination circuit 26 are the same as those of the phoneme determination circuit shown in FIG. 4. In the circuit of FIG. 7, however, when the register 58-1 of each of the data hold circuits 25-1 to 25-N is reset in response to the output signal through one of the AND gate circuits 82-1 to 82-N, its content is set to "0".

While the embodiment shown in FIGS. 5 to 7 is different from the embodiment shown in FIGS. 2 to 4 in which the distance data representing the Mahalanobis distance which becomes smaller as the similarity becomes greater is generated, in that it takes the correlation between the acoustic power spectrum data of the input voice and the reference phoneme and generates correlation data which becomes greater as the similarity of both the acoustic power spectrum data becomes greater, but these embodiments are alike insofar as the similarity expressed by the correlation data or distance data is used to determine the optimum phoneme data. It will thus be seen that in addition to the Mahalanobis distance and correlation data, any other similarity representing data such as likelihood ratio data may be used as well.

While the preferred embodiments of the invention have been described in the foregoing, they are by no means limitative. For example, it is possible to count the number of effective distance data successively obtained in the selection circuits 22-1 to 22-N in the above embodiments and store the count data into the register 58-1. In this case, when a start signal is generated from one of the data selection circuits 22-1 to 22-N, the content of the register 58-1 of one of the data hold circuits 24-1 to 24-N which is connected to the data selection circuit having generated a start signal is cleared if the count data obtained in the selection circuit is not maximum.

Further, while the upper limit of the effective distance data has been set to "400", it is possible to appropriately vary the limit. For instance, it may be set to "200". Further, while the effective distance pattern has been constituted by three successive effective data, it may also be constituted by two or more than three successive effective data as well.

Further, while in the above embodiments a plurality of parallel distance data have been generated from a plurality of data generator circuits 16-1 to 16-N, it is possible to sequentially calculate the distance between the input voice data and a plurality of reference phoneme data to be sequentially read out from a memory and serially produce the results of calculations on a time sharing basis.

What we claim is:

1. A phoneme information extracting apparatus comprising:
   memory means in which a plurality of reference acoustic parameters corresponding to respective reference phonemes are stored;
   acoustic parameter generating means for sequentially generating acoustic parameters corresponding to input voice;
   similarity data generating means for sequentially generating similarity related to the similarity between the acoustic parameter generated from said acoustic parameter generating means in each of the reference acoustic parameter is read out from said memory means;
   checking means for checking whether the received similarity data represents a greater degree of similarity than a predetermined degree of similarity;
   data selecting means for successively generating, when it is detected that a predetermined number of successive similarity data regarding the same reference acoustic parameter represent similarity degree greater than said predetermined similarity degree, the successive similarity data for the same reference acoustic parameter which are dealt as effective similarity data; and
   phoneme determining means for successively receiving effective similarity data from said data selecting means, holding data representing the maximum similarity degree among the effective similarity data and generating phoneme data representing a reference phoneme corresponding to the similarity data representing the maximum similarity degree.

2. A phoneme information extracting apparatus according to claim 1, wherein said similarity representing data generating means includes a plurality of distance data generating circuits for generating Mahalanobis distance data as similarity representing data concerning the similarity between each of the reference acoustic parameters and the acoustic parameter of input voice.

3. A phoneme information extracting apparatus according to claim 2, wherein said data selecting means includes a plurality of data selection circuits respectively connected to said distance data generation circuits and each including a shift register circuit having a plurality of cascade-connected shift registers, a control circuit for generating a control signal when it detects that the contents of said plurality of shift registers are all less than a predetermined value, a logic circuit operable in response to the output signal from said control circuit to permit the output data from said shift register circuit to be supplied to said phoneme determination means, and a first trigger signal generating circuit for generating a trigger signal in response to the interruption of a control signal from said control circuit.

4. A phoneme information extracting apparatus according to claim 3, wherein said shift register circuit includes at least three cascade-connected shift registers, and said data selecting means further includes a second trigger signal generating circuit for producing a trigger signal when it detects that the distance data in one of said at least three shift registers is greater than those in the immediately preceding and succeeding stage shift registers.

5. A phoneme information extracting apparatus according to claim 3 or 4, wherein said phoneme determination means includes minimum distance data hold circuits respectively connected to said data selecting circuits to hold the minimum distance data among the distance data respectively provided from the corresponding data selecting circuits, and a first detection circuit operable in response to a trigger signal from said data selecting means to detect that one of said maximum distance data hold circuits which holds the minimum distance data among the distance data held in said minimum distance data hold circuits.

6. A phoneme information extracting apparatus according to claim 5, wherein said phoneme determination means further includes a second detection circuit for detecting at least one of said data selection circuits that has generated a trigger signal and a coincidence circuit for comparing the output data from said first and second detection circuits and generating a first output signal indicating that the minimum distance data detected by said first selection circuit is effective when it detects the coincidence of both the input data.

7. A phoneme information extracting apparatus according to claim 6, wherein said coincidence circuit generates a second output signal when both the input data do not coincide, and said phoneme determination means further includes a circuit for clearing the content of at least one of said minimum distance data hold circuits connected to that one of said data selection circuits which has generated said trigger signal.

8. A phoneme information extracting apparatus according to claim 1, wherein said similarity representing data generating means includes a plurality of correlation data generation circuits for generating correlation data as similarity representing data regarding each of the reference phoneme parameters and the acoustic parameter of input voice.

9. A phoneme information extracting apparatus according to claim 8, wherein said data selecting means includes a plurality of data selection circuits respectively connected to said correlation data generating circuits and each including a shift register circuit having a plurality of cascade-connected shift registers, a control circuit for generating a control signal when it detects that the contents of said plurality of shift registers are all greater than a predetermined value, a logic circuit operable in response to a control signal from said control circuit to permit the output data from said shift register circuit to be supplied to said phoneme determination circuit and a first trigger circuit operable in response to an interruption of a control signal from said control circuit to generate a trigger signal.

10. A phoneme information extracting apparatus according to claim 9, wherein said shift register circuit includes at least three cascade-connected shift registers, and said data selection circuit includes a second trigger signal generating circuit for generating a trigger signal when it detects that the correlation data in one of said at least three shift registers is less than those in the immediately preceding and succeeding stage shift registers.

11. A phoneme information extracting apparatus according to claim 9 or 10, wherein said phoneme determination means includes maximum correlation data hold circuits respectively connected to said data selection circuits to hold the maximum correlation data among the correlation data respectively provided from the corresponding data selection circuits and a first detection circuit for detecting that one of said maximum correlation data hold circuits which holds the maximum correlation data among the correlation data held in said maximum correlation data hold circuits.

12. A phoneme information extracting apparatus according to claim 11, wherein said phoneme determination means further includes a second detecting circuit for detecting that one of said data selection circuits which has generated a trigger signal and a coincidence circuit for comparing the output data from said first and second detection circuits and generating a first output signal indicating that the maximum correlation data detected by said first detecting circuit is effective when it detects that both the input data compared coincide.

13. A phoneme information extracting apparatus according to claim 12, wherein said coincidence circuit generates a second output signal when it detects that both said input data do not coincide, and said phoneme determination means further includes a circuit connected to operate in response to output data from said second detecting circuit and a second output signal from said coincidence circuit to clear the content of at least one of said maximum correlation data hold circuits which is connected to at least one of said data selection circuits that has generated a trigger signal.

* * * * *

UNITED STATES PATENT AND TRADEMARK OFFICE
CERTIFICATE OF CORRECTION

PATENT NO. : 4,405,838
DATED : SEPTEMBER 20, 1983
INVENTOR(S) : TSUNEO NITTA ET AL

It is certified that error appears in the above-identified patent and that said Letters Patent is hereby corrected as shown below:

```
In column 11, line 42, after "similarity" first occurrence
insert --data--;
In column 11, line 44, delete "in" and substitute --and--;

In column 11, line 45, delete "parameter" and substitute therefor --parameters--;

In column 11, line 56, after "dealt" insert --with--.
```

Signed and Sealed this

Thirteenth Day of December 1983

[SEAL]

Attest:

Attesting Officer

GERALD J. MOSSINGHOFF

Commissioner of Patents and Trademarks